(12) United States Patent
Jung et al.

(10) Patent No.: US 9,246,358 B2
(45) Date of Patent: Jan. 26, 2016

(54) WIRELESS POWER TRANSMITTING APPARATUS HAVING SIGNAL DETECTING CIRCUIT FOR DETECTING TRANSMISSION SIGNALS

(71) Applicant: Hanrim Postech Co., Ltd., Suwon-si, Gyeonggi-do (KR)

(72) Inventors: Chun-Kil Jung, Seoul (KR); Soo-Dong Shon, Suwon-si (KR)

(73) Assignee: HANRIM POSTECH CO., LTD., Suwon-Si (KR)

( * ) Notice: Subject to any disclaimer, the term of this patent is extended or adjusted under 35 U.S.C. 154(b) by 392 days.

(21) Appl. No.: 13/723,980

(22) Filed: Dec. 21, 2012

(65) Prior Publication Data

US 2013/0162204 A1 Jun. 27, 2013

(30) Foreign Application Priority Data

Dec. 21, 2011 (KR) ........................ 10-2011-0138971

(51) Int. Cl.
*H02J 17/00* (2006.01)
*H02J 7/02* (2006.01)
*H04B 5/00* (2006.01)
*H02J 7/00* (2006.01)

(52) U.S. Cl.
CPC ................. *H02J 17/00* (2013.01); *H02J 7/025* (2013.01); *H04B 5/0031* (2013.01); *H04B 5/0037* (2013.01); *H04B 5/0056* (2013.01); *H04B 5/0093* (2013.01); *H02J 2007/0096* (2013.01)

(58) Field of Classification Search
CPC ... H02J 17/00; H02J 7/025; H02J 2007/0096; H04B 5/0031; H04B 5/0056; H04B 5/0093; H04B 5/0037
See application file for complete search history.

(56) References Cited

U.S. PATENT DOCUMENTS 6,486,615 B2 * 11/2002 Hui et al. .................... 315/291
7,215,251 B2 * 5/2007 Hyde ............................ 340/661
7,271,677 B2 * 9/2007 Troyk et al. .................. 332/100

(Continued)

FOREIGN PATENT DOCUMENTS

WO WO 2010/020895 A2 2/2010

OTHER PUBLICATIONS

European Search Report dated Jun. 25, 2013, issued in corresponding European Application No. 12198951.1—1852 / 2608419.

*Primary Examiner* — Naum B Levin
(74) *Attorney, Agent, or Firm* — Stein IP, LLC

(57) ABSTRACT

Disclosed herein are a signal detecting apparatus and a wireless power transmitting apparatus having the same. In the signal detecting apparatus, a resonance tank circuit is resonated by a magnetic field change of a power transmitting coil generated according to a signal transmitted to the wireless power transmitting apparatus by a power receiving apparatus to generate a resonance signal, and a signal extracting unit extracts the signal transmitted by the power receiving apparatus in the generated resonance signal. The resonance tank circuit includes a radio frequency identification (RFID) transponder detecting the magnetic field change signal of the power transmitting coil, and a capacitor connected in parallel with the RFID transponder to be resonated by the magnetic field change of the power transmitting coil. The signal transmitted to the wireless power transmitting apparatus by the power receiving apparatus may be accurately detected by a simple circuit configuration.

7 Claims, 3 Drawing Sheets

(56) References Cited

U.S. PATENT DOCUMENTS

| | | | |
|---|---|---|---|
| 7,319,396 B2* | 1/2008 | Homanfar et al. | 340/572.1 |
| 7,521,890 B2* | 4/2009 | Lee et al. | 320/108 |
| 7,579,906 B2* | 8/2009 | Kumar et al. | 329/364 |
| 7,659,892 B2* | 2/2010 | Tanada et al. | 345/211 |
| 7,952,322 B2* | 5/2011 | Partovi et al. | 320/108 |
| 7,952,323 B2* | 5/2011 | Lamothe | 320/108 |
| 8,159,182 B2* | 4/2012 | Kato et al. | 320/108 |
| 8,169,185 B2* | 5/2012 | Partovi et al. | 320/108 |
| 8,222,827 B2* | 7/2012 | Kuennen et al. | 315/224 |
| 8,390,433 B2* | 3/2013 | Warner et al. | 340/10.5 |
| 8,446,046 B2* | 5/2013 | Fells et al. | 307/104 |
| 8,462,734 B2* | 6/2013 | Laine et al. | 370/331 |
| 8,497,658 B2* | 7/2013 | Von Novak et al. | 320/108 |
| 8,577,479 B2* | 11/2013 | Wakamatsu | 700/22 |
| 8,594,567 B2* | 11/2013 | Finkenzeller et al. | 455/41.2 |
| 8,643,326 B2* | 2/2014 | Campanella et al. | 320/108 |
| 8,692,412 B2* | 4/2014 | Fiorello et al. | 307/104 |
| 8,855,554 B2* | 10/2014 | Cook et al. | 455/41.1 |
| 2003/0020479 A1* | 1/2003 | Koch et al. | 324/431 |
| 2006/0255943 A1* | 11/2006 | Hougen et al. | 340/572.1 |
| 2007/0126584 A1 | 6/2007 | Hyde et al. | 340/572.4 |
| 2007/0247084 A1* | 10/2007 | Zhao | 315/291 |
| 2008/0150476 A1* | 6/2008 | Lamothe | 320/107 |
| 2008/0157603 A1 | 7/2008 | Baarman et al. | 307/104 |
| 2009/0157145 A1* | 6/2009 | Cauller | 607/60 |
| 2009/0271047 A1* | 10/2009 | Wakamatsu | 700/295 |
| 2010/0127660 A1* | 5/2010 | Cook et al. | 320/108 |
| 2010/0160997 A1* | 6/2010 | Johnson et al. | 607/45 |
| 2010/0181961 A1* | 7/2010 | Novak et al. | 320/108 |
| 2010/0181963 A1* | 7/2010 | Schreiber | 320/108 |
| 2010/0188870 A1* | 7/2010 | Christensen | 363/21.02 |
| 2010/0277003 A1 | 11/2010 | Von Novak et al. | 307/104 |
| 2010/0328044 A1* | 12/2010 | Waffenschmidt et al. | 340/10.4 |
| 2011/0127953 A1* | 6/2011 | Walley et al. | 320/108 |
| 2011/0140653 A1* | 6/2011 | Jung et al. | 320/108 |
| 2012/0098486 A1* | 4/2012 | Jung | 320/108 |
| 2012/0242276 A1* | 9/2012 | Jung et al. | 320/103 |
| 2012/0256620 A1* | 10/2012 | Oettinger | 324/239 |
| 2014/0152253 A1* | 6/2014 | Ozaki et al. | 320/108 |

* cited by examiner

WIRELESS POWER TRANSMITTING APPARATUS HAVING SIGNAL DETECTING CIRCUIT FOR DETECTING TRANSMISSION SIGNALS

CROSS-REFERENCE TO RELATED APPLICATIONS

This application claims priority to Korean Patent Application No. 2011-0138971, filed on Dec. 21, 2011 in the Korean Intellectual Property Office, the disclosure of which is herein incorporated by reference in its entirety.

BACKGROUND OF THE INVENTION

1. Field of the Invention

The present invention relates to a signal detecting apparatus for detecting transmission signals transmitted by a power receiving apparatus in a wireless power transmitting system, and a wireless power transmitting apparatus having the signal detecting apparatus for detecting transmission signals.

2. Description of the Related Art

Generally, various portable terminals such as cellular phones, smart phones, personal digital assistants (PDAs), and the like, has been mounted with a power receiving apparatus for supplying an operation power thereto.

The power receiving apparatus, which is charged with a power supplied from an external charging apparatus and supplies the charged power as an operation power to the portable terminal to operate the portable terminal, may comprise a battery cell module charged with the power, a charging and discharging circuit which uses the power supplied from the external charging apparatus to charge the battery cell module and discharges the power charged in the battery cell module to supply the discharged power as the operation power to the portable terminal, and the like.

In a known method of electrically connecting the charging apparatus to the power receiving apparatus, a terminal through which the power is outputted from the charging apparatus is directly connected to a terminal to which the power is inputted into the power receiving apparatus through a cable, a connector, or the like.

With the terminal connection method, the terminal of the charging apparatus and the terminal of the power receiving apparatus have different potential differences. Therefore, when the terminals are connected to or disconnected from each other, an instantaneous discharging phenomenon occurs. This instantaneous discharging phenomenon causes abrasion of both terminals. In addition, if foreign materials have accumulated in the terminals, the foreign materials may be heated by the instantaneous discharging phenomenon, such that there is a risk of an accident such as a fire, or the like.

Further, the power charged in the battery cell module in the power receiving apparatus is naturally discharged into the environment through the terminal of the power receiving apparatus due to moisture, or the like, such that lifespan of the power receiving apparatus may decrease and performance of the power receiving apparatus may deteriorate.

Recently, a wireless power transmitting system which wirelessly transmits the power has been suggested in order to solve several problems of the terminal connection method as described above.

In known wireless power transmitting systems, a wireless power transmitting apparatus wirelessly transmits the power using electromagnetic induction. A power receiving apparatus then receives the power wirelessly transmitted by the wireless power transmitting apparatus and charges the received power into the battery cell module.

Many have sought to improve the described wireless power transmitting system such that the wireless power transmitting apparatus wirelessly transmits the power stably at high efficiency, and such that the power receiving apparatus receives as much of the power transmitted by the wireless power transmitting apparatus as possible to charge the power in the battery cell module.

In the known wireless power transmitting system described above, the power receiving apparatus generates a transmission signal, including a unique ID signal and a power charging information signal indicating the power charged in the battery cell module, and transmits the transmission signal to the wireless power transmitting apparatus through a power receiving coil, and the wireless power transmitting apparatus receives the transmission signal through a power transmitting coil.

Since a voltage and a current of the power transmitting coil of the wireless power transmitting apparatus are changed according to the transmission signal transmitted by the power receiving apparatus through the power receiving coil, the wireless power transmitting apparatus may detect the voltage and the current of the power transmitting coil using a voltage sensor, a current sensor, a current transducer, and the like, and determines the detected voltage and current by using a detecting circuit or the like to detect the transmission signal transmitted by the power receiving apparatus.

Therefore, a configuration of a circuit which detects the transmission signal transmitted by the power receiving apparatus is significantly complicated, such that manufacturing costs increase. Furthermore, there is a limited precision in detecting the transmission signal.

SUMMARY OF THE INVENTION

An object of the present invention is to provide a signal detecting apparatus which can uncomplicatedly detect a transmission signal transmitted by a power receiving apparatus without using a voltage sensor, a current sensor, and a current transducer, and a wireless power transmitting apparatus having the same.

Another object of the present invention is to provide a signal detecting apparatus which can uncomplicatedly detect a transmission signal using a radio frequency identification (RFID) transponder, and a wireless power transmitting apparatus having the same.

Still another object of the present invention is to provide a signal detecting apparatus which can precisely detect a transmission signal transmitted by a power receiving apparatus using a magnetic field change signal of a power transmitting coil generated according to the transmission signal, and a wireless power transmitting apparatus having the same.

Objects of the present invention are not limited to the above-mentioned objects. That is, other objects that are not mentioned may be obviously understood from the following description by those skilled in the relevant art.

While not limited thereto, according to an embodiment of the present invention, a signal detecting apparatus may comprise a magnetic field change signal detecting unit configured to detect a magnetic field change signal of a power transmitting coil generated according to a transmission signal transmitted by a power receiving apparatus; and a signal extracting unit configured to extract the transmission signal transmitted by the power receiving apparatus from the magnetic field change signal detected by the magnetic field change signal detecting unit.

According to an aspect of the invention, the magnetic field change signal detecting unit may comprise a resonance tank circuit resonated by the magnetic field change signal of the power transmitting coil to generate a resonance signal.

According to an aspect of the invention, the resonance tank circuit may comprise a radio frequency identification (RFID) transponder configured to detect the magnetic field change signal of the power transmitting coil; and a capacitor connected in parallel with the RFID transponder to allow resonance to be generated by the magnetic field change signal of the power transmitting coil.

According to an aspect of the invention, the signal extracting unit may comprise an envelope detecting unit configured to detect an envelope of the magnetic field change signal; a low pass filter configured to filter the envelope detected by the envelope detecting unit; and a comparator configured to compare an output signal of the low pass filter with a preset reference voltage to extract the transmission signal.

According to an aspect of the invention, the signal extracting unit may further comprise an amplifier disposed between the low pass filter and the comparator and configured to amplify the output signal of the low pass filter and output the amplified signal to the comparator.

According to an aspect of the invention, the transmission signal may comprise a unique ID signal of the power receiving apparatus and a power charging information signal of the battery cell module.

According to another embodiment of the present invention, a wireless power transmitting apparatus may comprise a power transmitting coil configured to wirelessly transmit a power to a power receiving apparatus; a signal detecting apparatus configured to use a magnetic field change signal of the power transmitting coil to detect a transmission signal transmitted by the power receiving apparatus; a power transmitting controlling unit configured to control the wirelessly transmission of the power to the power receiving apparatus, and to use the transmission signal detected by the signal detecting apparatus to determine a charged state of the power receiving apparatus; a driving driver configured to generate a driving signal under the control of the power transmitting controlling unit; and a series resonant converter configured to switch a direct current (DC) power according to the driving signal and output the switched power to the power transmitting coil.

According to an aspect of the invention, the number of power transmitting coils may be one, or two or more.

According to an aspect of the invention, the wireless power transmitting apparatus may further comprise an alternate current (AC) to direct current (DC) converter configured to convert an AC power into a DC power and supply the DC power as an operation power to the wireless power transmitting apparatus.

According to an aspect of the invention, the AC to DC converter may be integrated with the wireless power transmitting apparatus.

According to an aspect of the invention, the signal detecting apparatus may comprise a magnetic field change signal detecting unit configured to detect the magnetic field change signal of the power transmitting coil generated according to the transmission signal; and a signal extracting unit configured to extract the transmission signal transmitted by the power receiving apparatus from the magnetic field change signal detected by the magnetic field change signal detecting unit.

According to an aspect of the invention, the magnetic field change signal detecting unit may comprise a resonance tank circuit resonated by the magnetic field change signal of the power transmitting coil to generate a resonance signal.

According to an aspect of the invention, the resonance tank circuit may comprise an RFID transponder configured to detect the magnetic field change signal of the power transmitting coil; and a capacitor connected in parallel with the RFID transponder to allow resonance to be generated by the magnetic field change signal of the power transmitting coil.

According to an aspect of the invention, the signal extracting unit may comprise an envelope detecting unit configured to detect an envelope of the magnetic field change signal; a low pass filter configured to filter the envelope detected by the envelope detecting unit; and a comparator configured to compare an output signal of the low pass filter with a preset reference voltage to extract the transmission signal.

According to an aspect of the invention, the signal extracting unit may further comprise an amplifier disposed between the low pass filter and the comparator and configured to amplify the output signal of the low pass filter and output the amplified signal to the comparator.

According to an aspect of the invention, the transmission signal may comprise a unique ID signal of the power receiving apparatus and a power charging information signal of the battery cell module.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
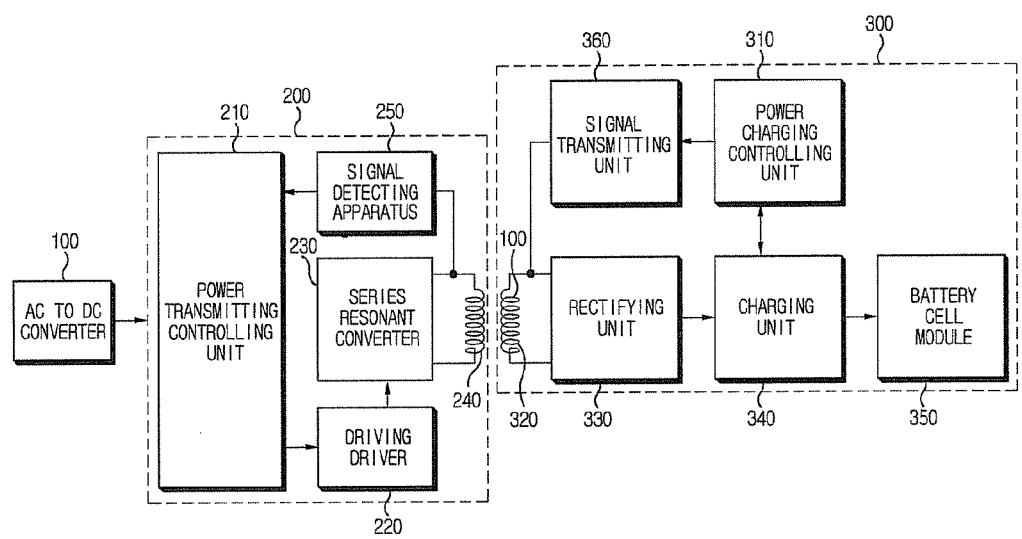
FIG. 1 is a block diagram showing a configuration of a wireless power transmitting system, according to an embodiment of the present invention.

Hereinafter, the present invention will be described in detail through embodiments thereof with reference to the accompanying drawings, in which the same reference numeral will be used to describe the same component. The embodiments are described below in order to explain the present invention by referring to the figures.

The following detailed description is only an example and only illustrates embodiments of the present invention. In addition, a principle and a concept of the present invention are provided in order to most usefully and easily describe the present invention. Therefore, for basic understanding of the present invention, a more detailed structure than necessary will not be provided, and several forms of the present invention that may be executed by those skilled in the art will be illustrated in the accompanying drawings.

FIG. 1 is a block diagram showing a configuration of a wireless power transmitting system according to an embodiment of the present invention. In the embodiment depicted in FIG. 1, an alternate current (AC) to direct current (DC) converter 100 converts an AC power input from the outside into a DC power.

A wireless power transmitting apparatus 200 switches the DC power converted by the AC to DC converter 100 and wirelessly transmits the switched power using, for example, electromagnetic induction. Although FIG. 1 depicts an embodiment in which the AC to DC converter 100 is separate from the wireless power transmitting apparatus 200, it is understood that the AC to DC converter 100 may alternatively be integrated within the wireless power transmitting apparatus 200 without departing from the scope of the present invention.

A power receiving apparatus 300 receives and charges the power wirelessly transmitted by the wireless power transmitting apparatus 200, generates a transmission signal comprising a unique ID signal and a power charging information signal, and transmits the transmission signal to the wireless power transmitting apparatus 200.

The wireless power transmitting apparatus 200 may comprise a power transmitting controlling unit 210, a driving driver 220, a series resonant converter 230, a power transmitting coil 240, and a signal detecting apparatus 250 according to the embodiment of the present invention.

The power transmitting controlling unit 210 controls the wireless transmission of the power to the power receiving apparatus 300.

The driving driver 220 generates a driving signal which directs the wireless transmission of the power, and the like, under a control of the power transmitting controlling unit 210.

The series resonant converter 230 switches a DC power supplied from the AC to DC converter 100, according to the driving signal generated by the driving driver 220.

The power transmitting coil 240 wirelessly transmits the power while being resonated by the AC power generated by the series resonant converter 230.

The signal detecting apparatus 250 detects the transmission signal transmitted by the power receiving apparatus 300 from a magnetic field change of the power transmitting coil 240 and provides the detected transmission signal to the power transmitting controlling unit 210.

The power receiving apparatus 300 may comprise a power charging controlling unit 310, a power receiving coil 320, a rectifying unit 330, a charging unit 340, a battery cell module 350, a signal transmitting unit 360, and the like.

The power charging controlling unit 310 controls a receipt and charging of the power wirelessly transmitted by the wireless power transmitting apparatus 200 and controls a generation, and transmission to the wireless power transmitting apparatus 200, of the transmission signal comprising the unique ID signal and the power charging information signal.

The power receiving coil 320 is coupled to the power transmitting coil 240 of the power transmitting apparatus 200 in an electromagnetic induction scheme to receive the power wirelessly transmitted by the power transmitting coil 240.

The rectifying unit 330 rectifies the power received by the power receiving coil 320 into a DC power.

The charging unit 340 charges the DC power rectified by the rectifying unit 530 into the battery cell module 350, under the control of the power charging controlling unit 310, and provides the power charging information to the power charging controlling unit 310.

The signal transmitting unit 360 generates the transmission signal comprising the unique ID signal and the power charging information under the control of the power receiving controlling unit 310 and transmits the generated transmission signal to the wireless power transmitting apparatus 200 through the power receiving coil 320.

In the wireless power transmitting system having the above-described configuration, the AC to DC converter 100 converts an AC power, received from an outside source such as an electric outlet, into a DC power, and supplies the converted DC power as an operation power to the wireless power transmitting apparatus 200, such that the wireless power transmitting apparatus 200 is normally operated.

In this state, when the wireless power transmitting apparatus 200 transmits the power to the power receiving apparatus 300, the power transmitting controlling unit 210 controls the driving driver 220 to generate a driving signal which directs the power transmission. The series resonant converter 230 switches the DC power outputted from the AC to DC converter 100, according to the driving signal, to convert the DC power into the AC power, and applies the converted AC power to the power transmitting coil 240 to generate resonance.

In one embodiment, the power transmitting coil 240 may be designed to resonate at a frequency of 100 kHz, the series resonant converter 230 may switch the DC power, according to the driving signal, to generate the AC power having the frequency of 100 kHz, and the AC power having the frequency of 100 kHz is applied to the power transmitting coil 240 to generate the resonance. It is understood that other frequencies are possible without departing from the scope of the invention.

When the resonance is generated in the power transmitting coil 240, the power is wirelessly transmitted while a large amount of current flows to the power transmitting coil 240.

The power receiving coil 320 of the power receiving apparatus 300 receives the power transmitted by the power transmitting coil 240, the rectifying unit 330 converts the received power into the DC power, and the charging unit 340 charges the converted DC power into the battery cell module 350 under the control of the power charging controlling unit 310.

In addition, the power charging controlling unit 310 determines an amount of power charged in the battery cell module 350 through the charging unit 340 and controls the signal transmitting unit 360 according to the determined amount of power to generate the transmission signal comprising the unique ID signal and the power charging information signal, and the transmission signal generated by the signal transmitting unit 360 is outputted to the power receiving coil 320.

In this case, the power receiving coil 320 generates a magnetic field change according to the transmission signal generated by the signal transmitting unit 360, and a magnetic field of the power transmitting coil 240 is changed according to the generated magnetic field change.

The signal detecting circuit 250 detects the magnetic field change of the power transmitting coil 240, detects the transmission signal generated by the signal transmitting unit 360 from the detected magnetic field change, and outputs the detected transmission signal to the power transmitting controlling unit 210.

The power transmitting controlling unit 210 uses the transmission signal detected by the signal detecting circuit 250 to determine whether or not the power charging of the power receiving apparatus 300 has been completed.

If it is determined that the power charging of the power receiving apparatus 300 has not been completed, the power transmitting controlling unit 210 continuously performs the operation as described above to continuously wirelessly transmit the power to the power receiving apparatus 300.

On the other hand, if it is determined that the power charging of the power receiving apparatus 300 has been completed, the power receiving apparatus 300 controls the driving driver 220 not to generate the driving signal, thereby stopping the wireless transmission of the power.

Figure 2:
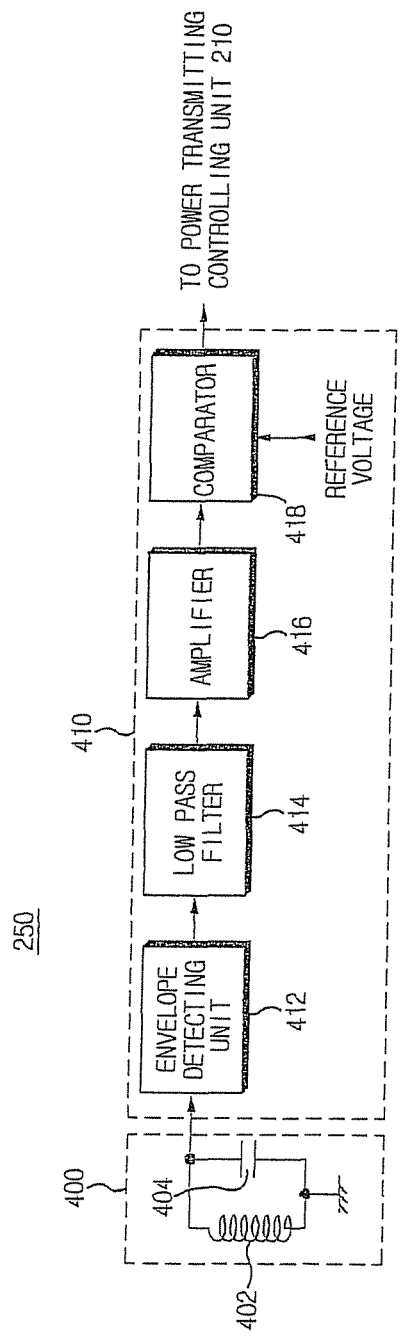
FIG. 2 is a block diagram showing a configuration of a signal detecting apparatus, according to an embodiment of the present invention.

FIG. 2 is a block diagram showing a configuration of a signal detecting apparatus 220 according to the embodiment of the present invention. In the embodiment depicted in FIG. 2, a resonance tank circuit 400 may comprise a radio frequency identification (RFID) transponder 402 and a capacitor 404. The RFID transponder 402, which is disposed close to the power transmitting coil 240, detects the magnetic field change signal according to the magnetic field change generated in the power transmitting coil 240. In addition, the capacitor 404 is connected in parallel with the RFID transponder 402 and is resonated by the magnetic field change signal detected by the RFID transponder 402 to generate a resonance signal.

A signal extracting unit 410 extracts the transmission signal transmitted by the power receiving apparatus 300 from the resonance signal of the resonance tank circuit 400 and outputs the extracted transmission signal to the power transmitting controlling unit 210. The signal extracting unit 410 may comprise an envelope detecting unit 412, a low pass filter 414, an amplifier 416, and a comparator 418.

The envelope detecting unit 412 detects an envelope signal from the resonance signal of the resonance tank circuit 400.

The low pass filter 414 detects and filters a low frequency signal from the envelope signal detected by the envelope detecting unit 412.

The amplifier 416 amplifies the signal which has been low-pass-filtered by the low pass filter 414.

The comparator 418 compares the signal amplified by the amplifier 416 with a preset reference voltage to extract the signal transmitted by the power receiving apparatus 300 and outputs the extracted signal to the power transmitting controlling unit 210.

In the signal detecting apparatus 250 according to the embodiment of the present invention having the above-described configuration, the RFID transponder 402 of the resonance tank circuit 400 detects the magnetic field change of the power transmitting coil 240 generated according to the transmission signal transmitted by the power receiving apparatus 300.

The capacitor 404 is connected in parallel with the RFID transponder 402, and the RFID transponder 402 and the capacitor 404 are resonated in parallel with each other according to the magnetic field change signal detected by the RFID transponder 402 to generate the resonance signal.

In some embodiments, the transmission signal transmitted by the power receiving apparatus 300 is transmitted at a predetermined frequency, the magnetic field change is generated in the power transmitting coil 240 according to the predetermined frequency of the transmission signal, and the RFID transponder 402 and the capacitor 404 are resonated in parallel with each other at the frequency according to the magnetic field change to generate the resonance signal.

The envelope detecting unit 412 of the signal extracting unit 410 detects the envelope signal from the resonance signal. Then, the detected envelope signal is filtered by the low pass filter 414, amplified by the amplifier 416, and then inputted into the comparator 418.

Next, the comparator 418 compares the output signal of the amplifier 416 with a preset reference voltage to extract the transmission signal transmitted by the power receiving apparatus 300, and outputs the extracted transmission signal to the power transmitting controlling unit 210. Then, the power transmitting controlling unit 210 determines whether or not the power charging of the power receiving apparatus 300 has been completed using the transmission signal extracted by the comparator 418.

Figure 3:
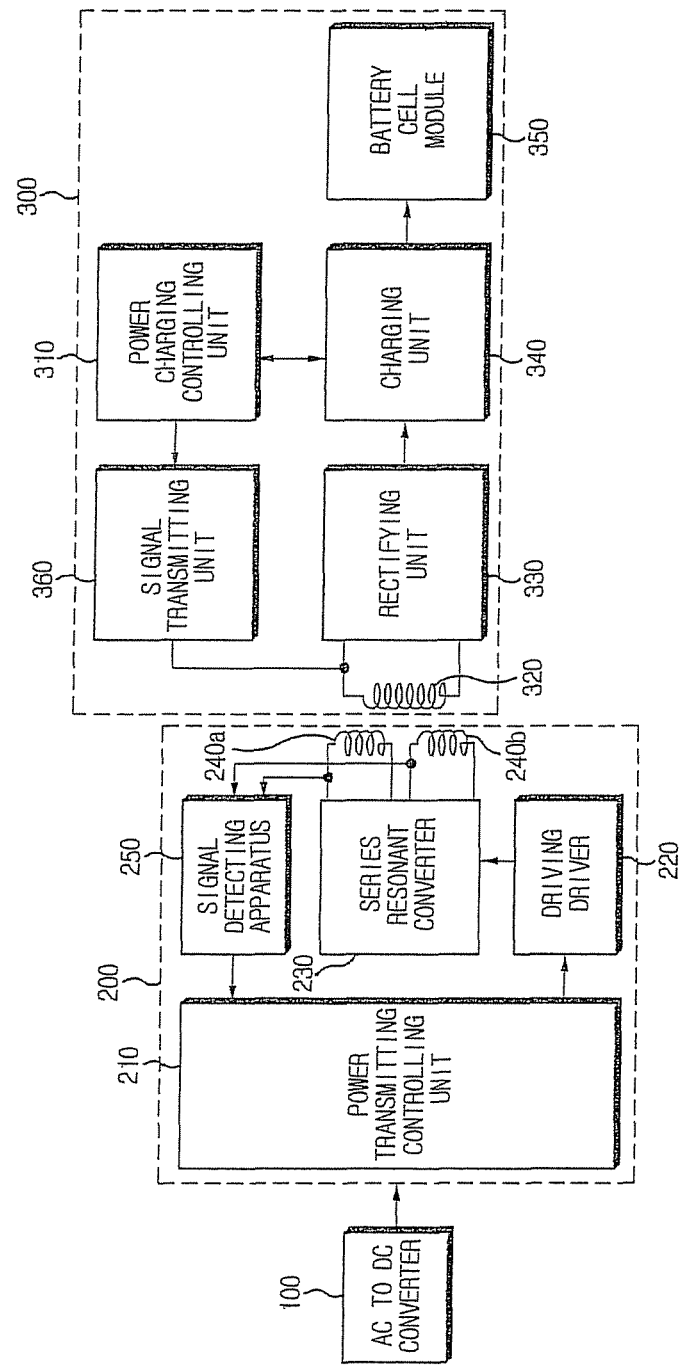
FIG. 3 is a block diagram showing a configuration of a wireless power transmitting system, according to another embodiment of the present invention.

FIG. 3 is a block diagram showing a configuration of a wireless power transmitting system according to another embodiment of the present invention. Referring to the embodiment depicted in FIG. 3, the wireless power transmitting apparatus 200 according to another embodiment of the present invention may comprise two power transmitting coils 240a and 240b.

In such an embodiment, the series resonant converter 230 generates two AC powers and outputs the two AC powers to the two power transmitting coils 240a and 240b, respectively, and the two power receiving coils 240a and 240b wirelessly transmits the powers while being resonated.

Since an operation of the wireless power transmitting apparatus 200 comprising the two power transmitting coils 240a and 240b may be comparable to that of the wireless power transmitting apparatus according to other embodiments of the present invention already described above, a detailed description thereof will be omitted.

Additionally, although embodiments in which the wireless power transmitting apparatus 200 comprise one power transmitting coil 240 or two power transmitting coils 240a and 240b have been described above by way of example, the present invention is not limited thereto. That is, the wireless power transmitting apparatus 300 may also comprise three or more power transmitting coils.

With the signal detecting apparatus and the wireless power transmitting apparatus having the same, according to the above-described embodiments of the present invention, the resonance tank circuit comprises the RFID transponder detecting the magnetic field change of the power transmitting coil and the capacitor to generate the resonance signal, and the transmission signal transmitted by the power receiving apparatus is extracted from the generated resonance signal.

Therefore, a configuration of the circuit extracting the signal transmitted by the power receiving apparatus is significantly uncomplicated, thereby making it possible to decrease a manufacturing cost of the wireless power transmitting apparatus and more precisely detect the transmission signal.

Although a few embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A wireless power transmitting apparatus comprising:
   a power transmitting coil configured to wirelessly transmit a power to a power receiving apparatus;
   a signal detecting apparatus configured to detect a transmission signal including a unique ID signal and a power charging information signal, transmitted by the power receiving apparatus, by using a magnetic field change of the power transmitting coil according to the transmission signal;
   a power transmitting controlling unit configured to control that the power is wirelessly transmitted to the power receiving apparatus and judges a charged state of the power receiving apparatus using the transmission signal detected by the signal detecting apparatus;

a driving driver configured to generate a driving signal under the control of the power transmitting controlling unit; and a series resonant converter configured to switch a direct current (DC) power according to the driving signal and output the switched power to the power transmitting coil, wherein the signal detecting apparatus comprises:

a magnetic field change signal detecting unit configured to detect the magnetic field change signal of the power transmitting coil which is generated according to the transmission signal; and a signal extracting unit configured to extract the transmission signal transmitted by the power receiving apparatus from the magnetic field change signal detected by the magnetic field change signal detecting unit, wherein the magnetic field change signal detecting unit comprises a resonance tank circuit resonated by the magnetic field change signal of the power transmitting coil to generate a resonance signal, wherein the resonance tank circuit comprises:

an RFID transponder configured to detect the magnetic field change signal of the power transmitting coil; and a capacitor connected in parallel with the RFID transponder to allow resonance to be generated by the magnetic field change signal of the power transmitting coil.

2. The wireless power transmitting apparatus of claim 1, further comprising at least one additional power transmitting coil.

3. The wireless power transmitting apparatus of claim 1, further comprising an AC/DC converter configured to convert an AC power into a DC power and supply the DC power as an operation power to the wireless power transmitting apparatus.

4. The wireless power transmitting apparatus of claim 3, wherein the AC/DC converter is integrated with the wireless power transmitting apparatus.

5. The wireless power transmitting apparatus of claim 1, wherein the signal extracting unit comprises:

an envelope detecting unit configured to detect an envelope of the magnetic field change signal;

a low pass filter configured to filter the envelope detected by the envelope detecting unit; and a comparator configured to compare an output signal of the low pass filter with a preset reference voltage to extract the transmission signal.

6. The wireless power transmitting apparatus of claim 5, wherein the signal extracting unit further comprises an amplifier disposed between the low pass filter and the comparator and configured to amplify the output signal of the low pass filter and output the amplified signal to the comparator.

7. The wireless power transmitting apparatus of claim 1, wherein the transmission signal comprises:

a unique ID signal of the power receiving apparatus; and a power charging information signal of the battery cell module.

* * * * *